United States Patent
Maruyama et al.

[11] Patent Number: 6,109,653
[45] Date of Patent: Aug. 29, 2000

[54] VEHICLE BODY STRUCTURE AT A REAR PORTION OF A VEHICLE

[75] Inventors: Kazuhiko Maruyama; Masashi Ohkubo, both of Saitama, Japan

[73] Assignee: Honda Giken Kogyo Kabushiki Kaisha, Tokyo, Japan

[21] Appl. No.: 09/178,124

[22] Filed: Oct. 23, 1998

[30] Foreign Application Priority Data

Oct. 30, 1997 [JP] Japan ..................................... 9-298490

[51] Int. Cl.$^7$ ................................................. B62D 21/00
[52] U.S. Cl. ..................... 280/781; 280/124.151
[58] Field of Search ........................... 280/781, 124.151, 280/FOR 112

[56] References Cited

U.S. PATENT DOCUMENTS

2,334,702  11/1943  Newton .
2,888,271  5/1959  Butterfield .

*Primary Examiner*—Eric Culbreth
*Attorney, Agent, or Firm*—Carrier, Blackman & Associates, P.C.; Joseph P. Carrier; William D. Blackman

[57] ABSTRACT

A side frame 1 of a grooved or channel-shaped sectional configuration has a bottom wall 2 and sidewalls 3 and 4. A first stiffener 9 closing a portion of an open upper surface of the side frame 1 and a second stiffener 10 superposed on the bottom wall 2 are welded to the side frame 1 to reinforce the side frame 1. A cup-shaped spring base 11 is fitted from below into and welded to openings $2_1$ and $10_3$ defined in the bottom wall 2 and the second stiffener 10, and an upper end of a coil spring 19 is accommodated within the spring base 11. The side frame 1, which is reduced in rigidity due to the opening $2_1$ can be reinforced with the first and second stiffeners 9 and 10, whereby a sufficient rigidity of the side frame can be ensured.

19 Claims, 7 Drawing Sheets

VEHICLE BODY STRUCTURE AT A REAR PORTION OF A VEHICLE

BACKGROUND OF THE INVENTION

1. Field of the Invention

The present invention relates to a vehicle body structure at a rear portion of a vehicle, comprising a spring accommodating recess provided in a side frame extending in a longitudinal direction of a vehicle body for accommodating an upper end of a coil spring of a rear suspension.

2. Description of the Related Art

A vehicle body structure in a vehicle involving a coil spring as a component of a rear suspension is known from U.S. Pat. No. 2,888,271, in which a portion of a side frame is curved upwards to ensure a space for placement of the coil spring, and the coil spring is supported at its upper end on the curved portion of the side frame. A vehicle body structure is also known from U.S. Pat. No. 2,334,702, in which a space for placement of a coil spring is ensured by accommodating an upper end of the coil spring in a spring accommodating recess defined in a vehicle body frame.

The former known vehicle body structure suffers from a problem that flattening of the surface of a floor at a rear portion of the vehicle body and lowering of the level of the floor are hindered, because the portion of the side frame is curved upwards. The latter known vehicle body structure suffers from a problem that the rigidity of the vehicle body frame is reduced, because the spring accommodating recess is defined in the vehicle body frame. Particularly, when the vehicle body frame is formed from a grooved member with its upper surface opened, there is a possibility that a remarkable reduction in rigidity is brought about, if an opening of the spring accommodating recess is defined in a bottom wall of the vehicle body frame.

SUMMARY OF THE INVENTION

Accordingly, it is an object of the present invention to ensure the rigidity of the side frame of a vehicle body structure, while lowering the level of the floor in the vehicle with the upper end of the coil spring of the rear suspension being accommodated within the side frame.

To achieve the above object, according to a first aspect and feature of the present invention, there is provided a vehicle body structure at a rear portion of a vehicle, comprising a side frame extending in a longitudinal direction of a vehicle body, a spring accommodating recess provided in the side frame for accommodating an upper end of a coil spring of a rear suspension, wherein the side frame is formed with a grooved sectional configuration having an open upper surface, and includes a bottom wall and left and right sidewalls, a first stiffener connected to the side frame for closing and reinforcing an open portion of the upper surface of the side frame in the vicinity of the spring accommodating recess, and an opening of the spring accommodating recess being defined in the bottom wall of the side frame.

If the opening is defined in the bottom wall of the side frame in order to provide the spring accommodating recess in the side frame for accommodating the upper end of the coil spring of the rear suspension, the rigidity of the side frame is reduced due to the opening. With the above arrangement of the invention, however, it is possible to ensure the sufficient rigidity of the side frame, while avoiding an interference of the coil spring and the side frame with each other to permit lowering of the level of a floor, by closing and reinforcing the open portion of the upper surface of the side frame in the vicinity of the spring accommodating recess.

According to a second aspect and feature of the present invention, in addition to the first feature, the upper surface of the bottom wall of the side frame in the vicinity of the spring accommodating recess is reinforced with a second stiffener superposed thereon, and the opening of the spring accommodating recess is defined in the bottom wall of the side frame and the second stiffener which are superposed on each other.

With the above arrangement, the rigidity of the side frame can be further enhanced by reinforcing the upper surface of the bottom wall of the side frame in the vicinity of the spring accommodating recess with the second stiffener superposed on the upper surface of the bottom wall.

According to a third aspect and feature of the present invention, in addition to the second feature, the longitudinal dimension of the second stiffener is set larger than that of the first stiffener.

With the above arrangement, the strength of the bottom wall of the side frame is largely reduced due to the formation of the opening, but the effect of reinforcing the side frame can be enhanced by providing the larger dimension of the second stiffener superposed on the bottom wall.

According to a fourth aspect and feature of the present invention, in addition to the first feature, a cup-like spring base having an open lower surface is fitted from below into the opening of the spring accommodating recess, an upper end of the spring base is coupled to the first stiffener, while a lower end of the spring base is coupled to the bottom wall of the side frame.

With the above arrangement, the bottom wall of the side frame can be connected to the first stiffener by the spring base to provide an enhancement in rigidity, and it is possible to block the entry of mud and the like through the opening of the spring accommodating recess into the side frame by the spring base.

According to a fifth aspect and feature of the present invention, in addition to the first feature, a cross frame is coupled at an end face thereof to a side of the side frame, and the spring accommodating recess is disposed in the vicinity of coupled portions of the side frame and the cross frame.

With the above arrangement, the side frame with its rigidity reduced due to the opening defined in the bottom wall can be reinforced with the cross frame.

According to a sixth aspect and feature of the present invention, in addition to the fifth feature, the side frame and the cross frame are disposed at substantially the same level.

With the above arrangement, the reinforcing effect of the cross frame can be further enhanced because the side frame and the cross frame are disposed at substantially the same level.

According to a seventh aspect and feature of the present invention, in addition to the first feature, the side frame has a recess in its sidewall for accommodating a base end of an upper arm of the rear suspension.

With the above arrangement, the base end of the upper arm of the rear suspension is accommodated in the recess defined in the sidewall of the side frame and therefore, the height of the side frame can be suppressed to a lower level. Correspondingly, a floor of the vehicle can also be disposed at a lower level, while avoiding the interference of the upper arm and the side frame with each other.

According to an eighth aspect and feature of the present invention, in addition to the seventh feature, a rear damper is connected at a base end thereof to a rear damper supporting bracket mounted on a side of the side frame, a portion of the rear damper being accommodated in the recess defined in the sidewall of the side frame.

With the above arrangement, since the portion of the rear damper is accommodated in the recess defined in the sidewall of the side frame, again, the level of the side frame can be suppressed to a lower level to achieve a corresponding lowering of a floor of the vehicle, while avoiding the interference of the rear damper and the side frame with each other.

The above and other objects, features and advantages of the invention will become apparent from the following description of the presently preferred embodiment thereof taken in conjunction with the accompanying drawings.

DETAILED DESCRIPTION OF THE PREFERRED EMBODIMENTS

The present invention will now be described by way of the preferred embodiment with reference to the accompanying drawings.

Figure 6:
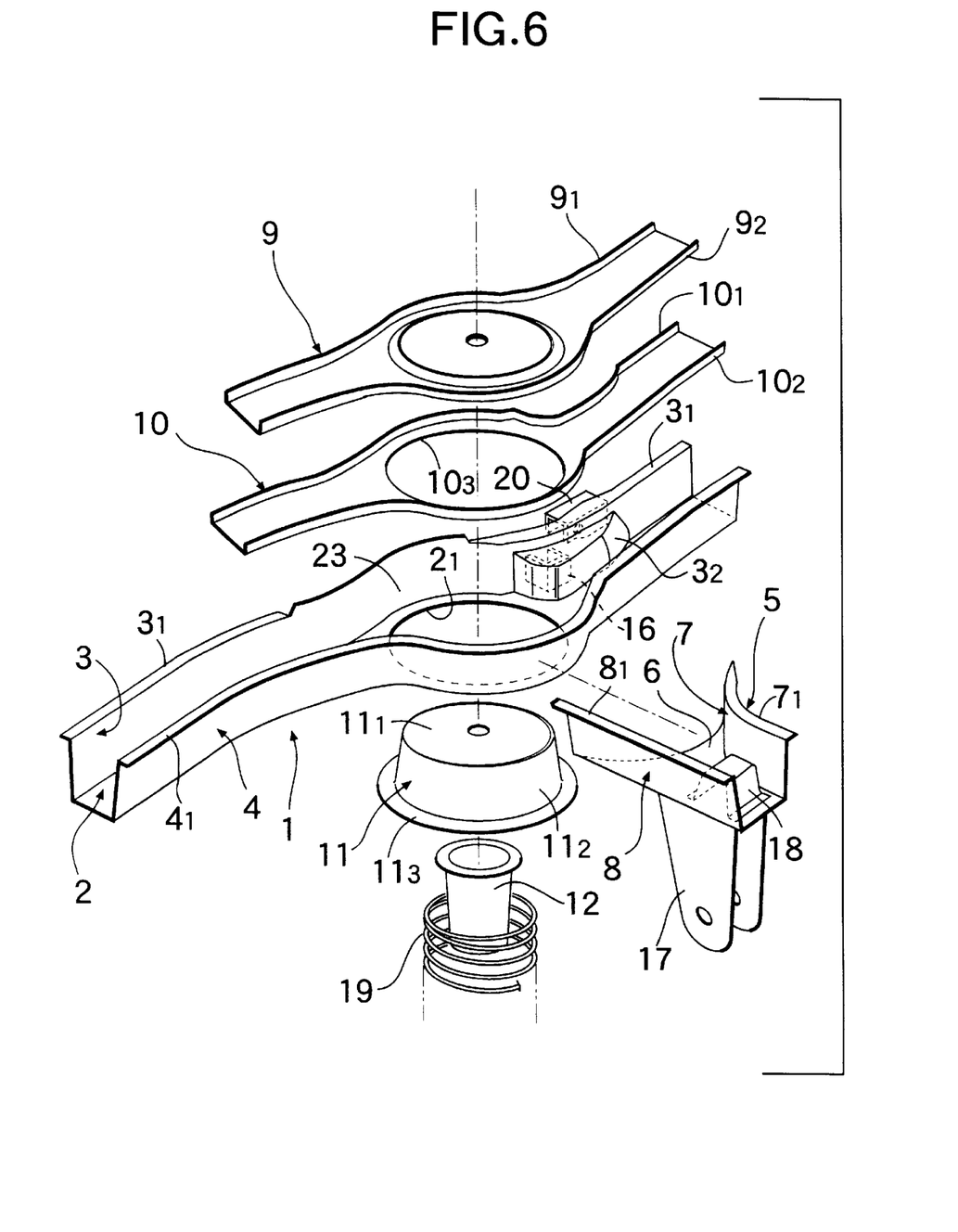
FIG. 6 is an exploded perspective view of the vehicle body structure showing the arrangement of the components thereof.
Figure 7:
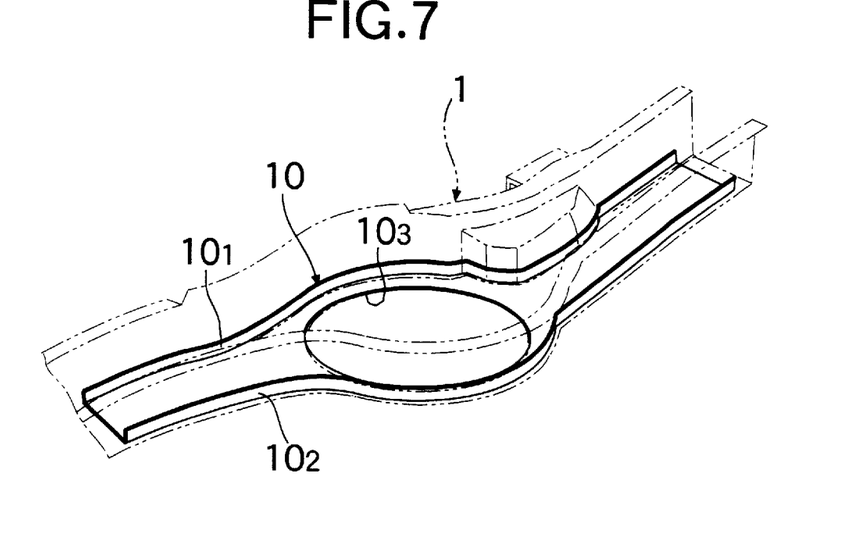
FIG. 7 is a perspective view of a stiffener (solid lines) and a side frame (broken lines) of the vehicle body structure, showing disposition of these components relative to each other.
Figure 8:
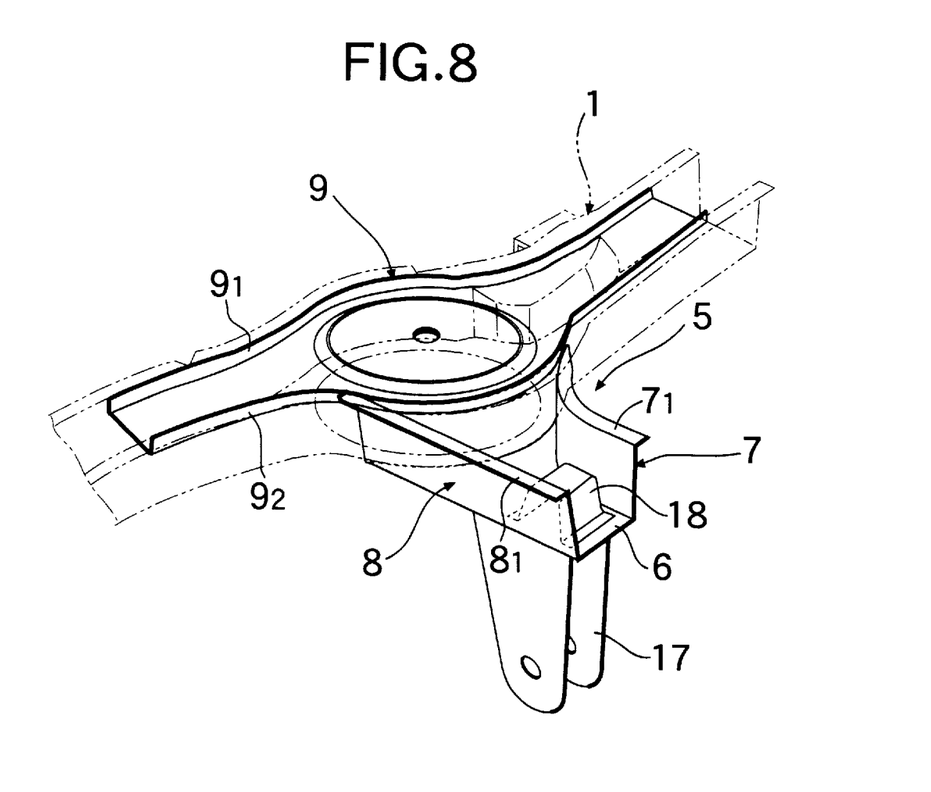
FIG. 8 is a perspective view of another stiffener (solid lines), an end section of a cross frame (solid lines) and the side frame (broken lines) of the vehicle body structure showing disposition of these components relative to each other.

The left one of a pair of left and right side frames disposed longitudinally on opposite sides of a vehicle body is designated by reference character 1. The right one of the side frames is symmetrically identical to the left side frame 1, and correspondingly the description focuses on the left side frame 1 and associated components. The side frame 1 is a grooved or channel-shaped member with an open upper surface, which includes a bottom wall 2, and left and right sidewalls 3 and 4 risen from left and right opposite side edges of the bottom wall 2. Flanges $3_1$ and $4_1$ are integrally formed at upper ends of the left and right sidewalls 3 and 4 and coupled to a lower surface of a floor panel of the vehicle which is not shown. The bottom wall 2 of the side frame 1 has a laterally width increased at a longitudinally central portion, and a circular opening $2_1$ (see FIGS. 4 and 6) is defined at such portion. A recess $3_2$ (see FIGS. 2, and 5–8) is integrally formed in the outer sidewall 3 of the side frame 1 to lie laterally and forwards of the opening $2_1$.

Figure 3:
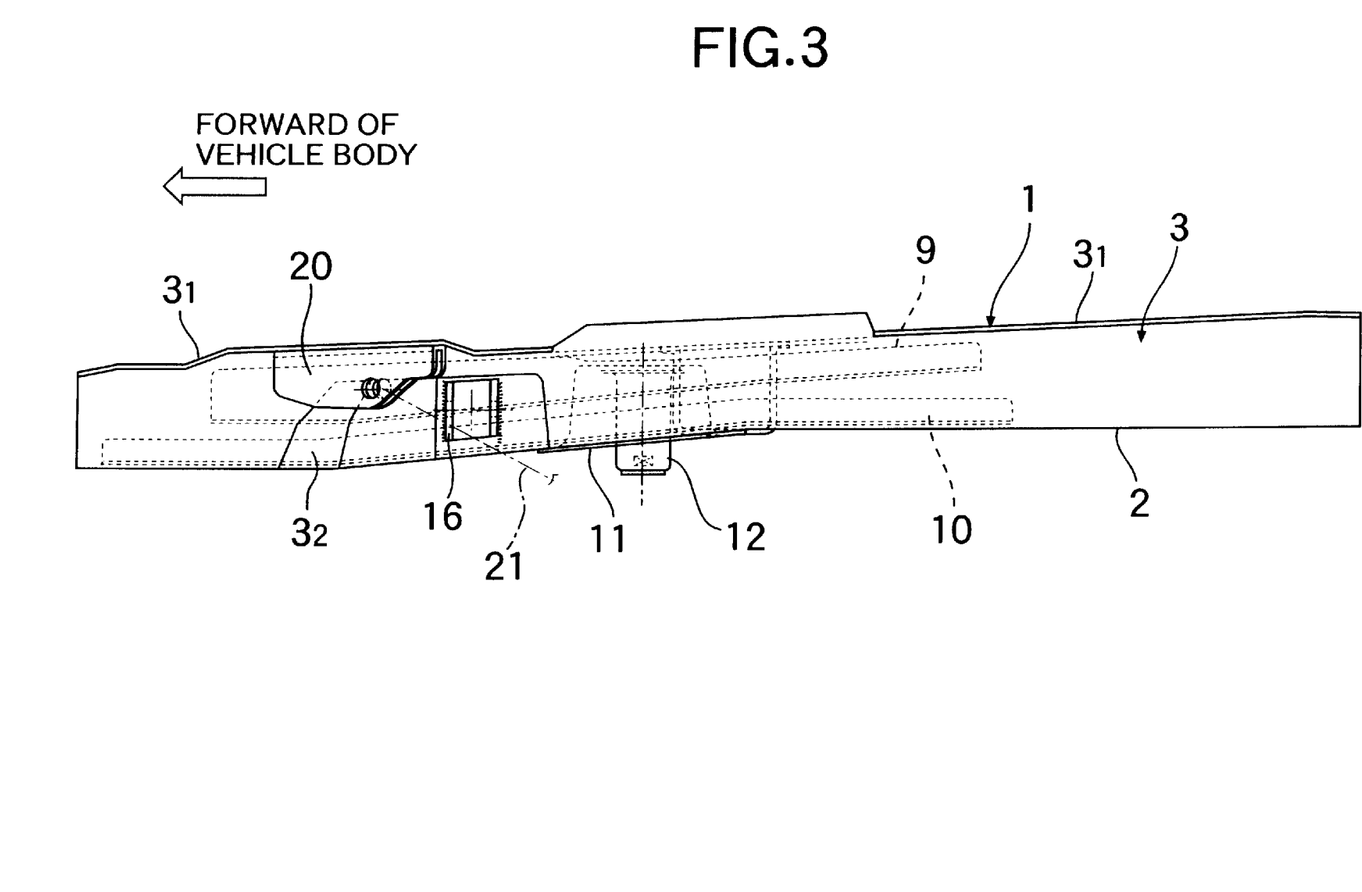
FIG. 3 is a side elevational view of the vehicle body structure looking in the direction of arrow 3 in FIG. 2.

A cross frame connecting the left and right side frames 1 is divided into three sections: a central section and left and right opposite end sections. The left end section 5 of the cross frame is coupled to a right side of the left side frame 1. The left end frame section 5 is also a grooved or channel-shaped member with an open upper surface, which includes a bottom wall 6, and longitudinal sidewalls 7 and 8. Flanges $7_1$ and $8_1$ are integrally formed at upper ends of the sidewalls 7 and 8 and also coupled to the lower surface of the floor panel (not shown). The front and rear flanges $7_1$ and $8_1$ of the cross frame member 5 are superposed on and welded to a lower surface of the right flange $4_1$ of the side frame 1, and a left end of the bottom wall 6 of the cross frame member 5 is superposed on and welded to a lower surface of an outer periphery of the opening $2_1$ (see FIGS. 2, 4 and 8). First and second stiffeners 9, 10, respectively, are connected to the side frame. The longitudinal dimension of the second stiffener 10 is larger than that of the first stiffener 9 (see FIGS. 2 and 3).

Figure 4:
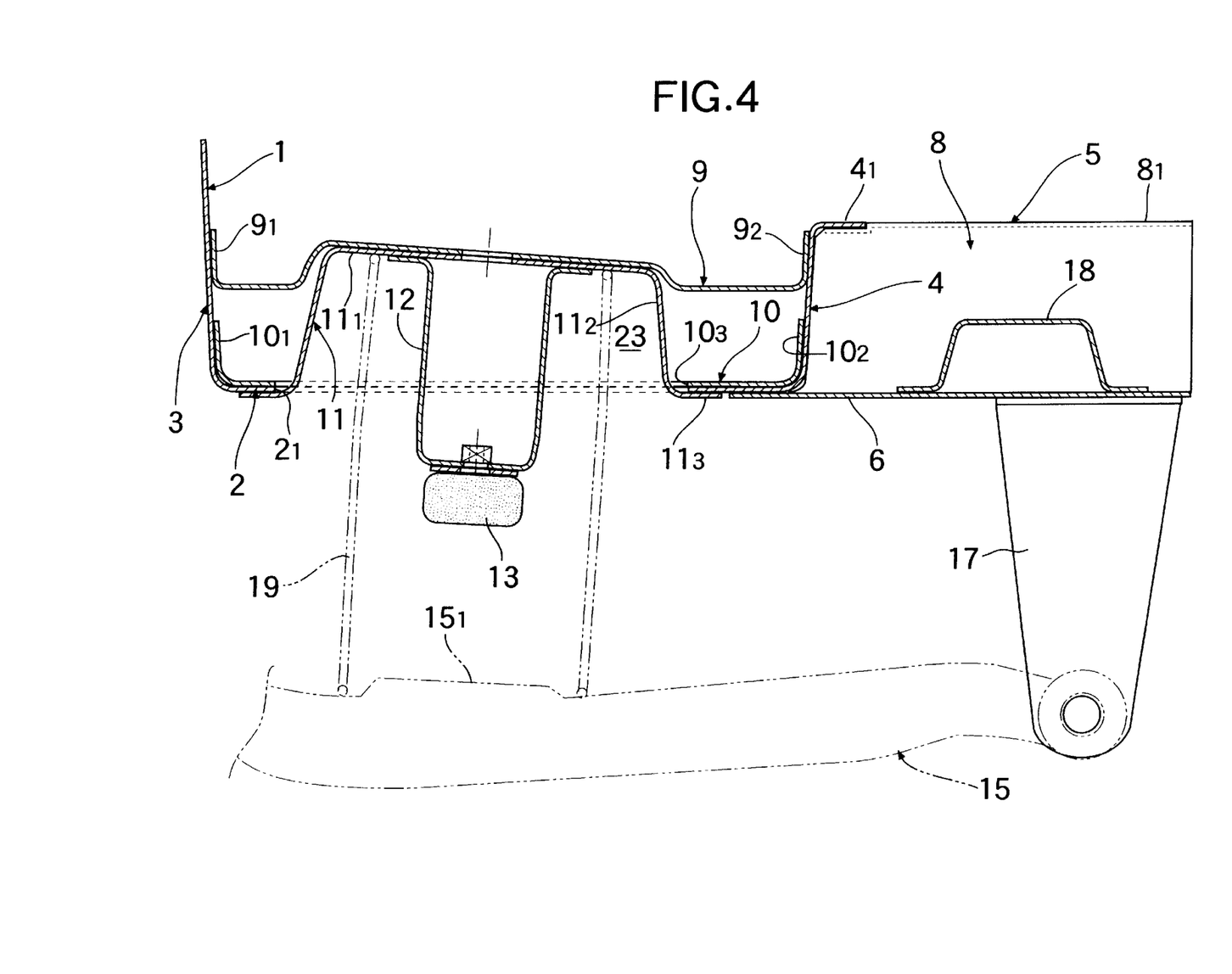
FIG. 4 is a sectional view looking along and in a direction of offset line 4—4 in FIG. 2.
Figure 5:
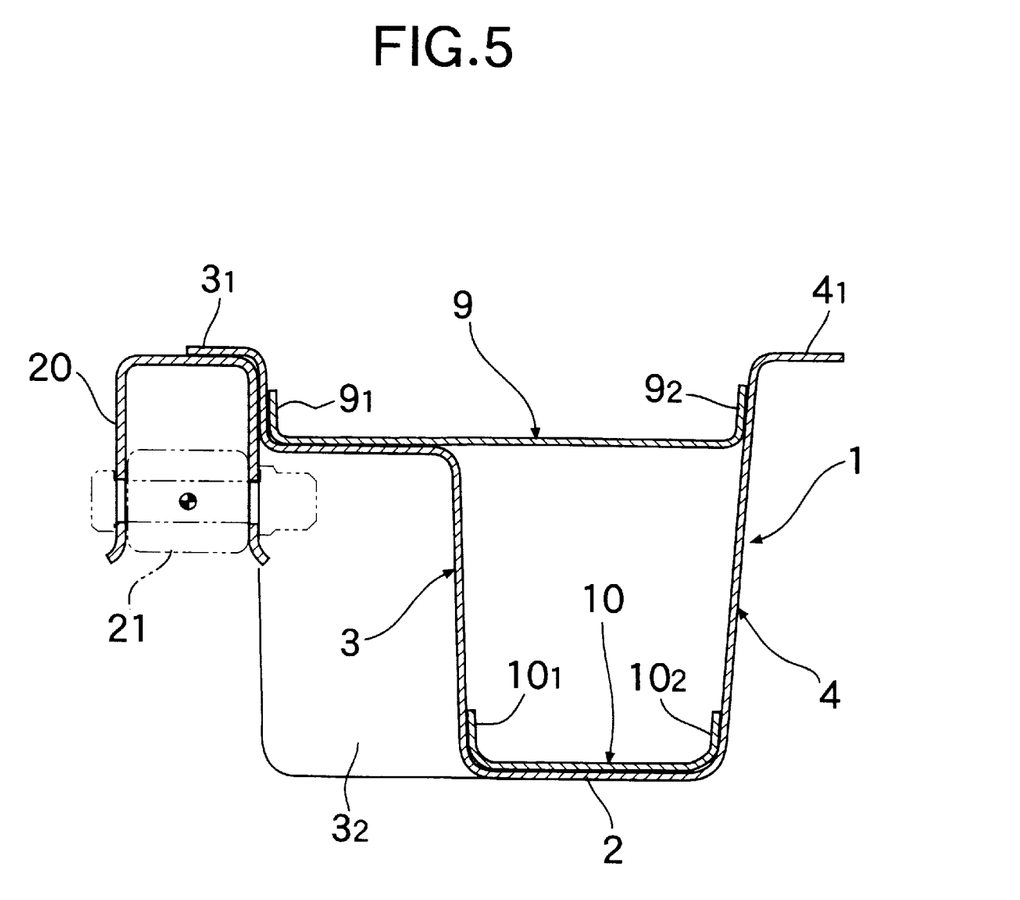
FIG. 5 is a sectional view looking along and in a direction of line 5—5 in FIG. 2.

As can be seen from FIG. 4, the side frame and the cross frame member 5 are disposed at the same level and coupled to each other, and although not shown at a front portion of the vehicle body, opposite ends of another cross frame 5 are coupled at the same level to the left and right side frames 1. Since the left and right side frames 1 and the front and rear cross frames 5 are coupled at the same plane in a framework fashion, as described above, the rigidity of the vehicle body frame to torsion can be enhanced and, moreover, the level of the floor of the vehicle can be lowered.

To reinforce the side frame 1 with its rigidity reduced due to the opening $2_1$ defined in the bottom wall 2, the first and second stiffeners 9 and 10 are welded to the side frame 1. The first stiffener 9 is a substantially plate-shaped member having flanges $9_1$ and $9_2$ risen upwards from left and right opposite side edges of the plate-shaped member. With the first stiffener 9 fitted into an opening in the upper surface of the side frame 1 from above, the flanges $9_1$ and $9_2$ thereof are welded to inner surfaces of the sidewalls 3 and 4 of the side frame 1 (see FIG. 4). The second stiffener 10 is also a substantially plate-shaped member having flanges $10_1$ and $10_2$ risen upwards from left and right opposite side edges of the plate-shaped member. With the stiffener 10 fitted into an opening in the upper surface of the side frame 1 from above and superposed onto the bottom wall 2 of the side frame 1, flanges $10_1$ and $10_2$ thereof are welded to inner surfaces of the sidewalls 3 and 4 of the side frame 1 (see FIG. 4). The second stiffener 10 is provided with an opening $10_3$ lying on the opening $2_1$ in the bottom wall 2 of the side frame 1 and having the same size as the opening $2_1$ (see FIGS. 4, 6 and 7).

A substantially cup-shaped spring base 11 integrally provided with a bottom wall $11_1$, a sidewall $11_2$ and a flange $11_3$ is fitted from below into the openings $2_1$ and $10_3$ in the side frame 1 and the second stiffener 10. An upper surface of the flange $11_3$ of the spring base 11 is superposed onto and welded to the lower surface of the bottom wall 2 of the side frame 1, while an upper surface of the bottom wall $11_1$ of the spring base 11 is superposed onto and welded to the lower surface of the first stiffener 9 (see FIG. 4). A substantially cup-shaped stopper supporting bracket 12 is welded to a lower surface of the bottom wall $11_1$ of the spring base 11, and a stopper 13 made of a rubber is fixed to a lower surface of the stopper supporting bracket 12.

Figure 1:
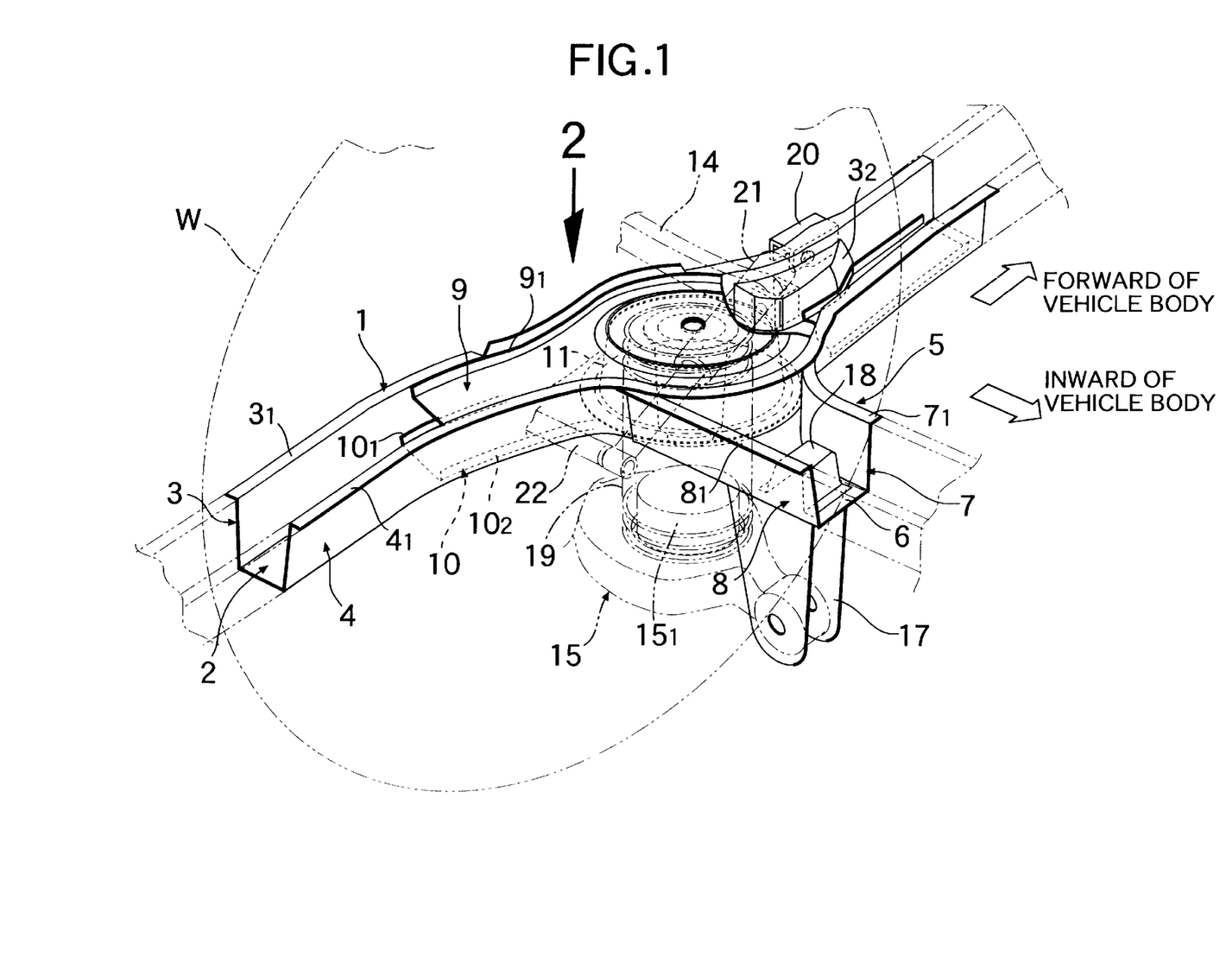
FIG. 1 is a top perspective view of a vehicle body structure at a rear portion of a vehicle according to the presently preferred embodiment of the invention, with portions of the structure and associated components of the vehicle shown in broken lines for understanding of the structure.
Figure 2:
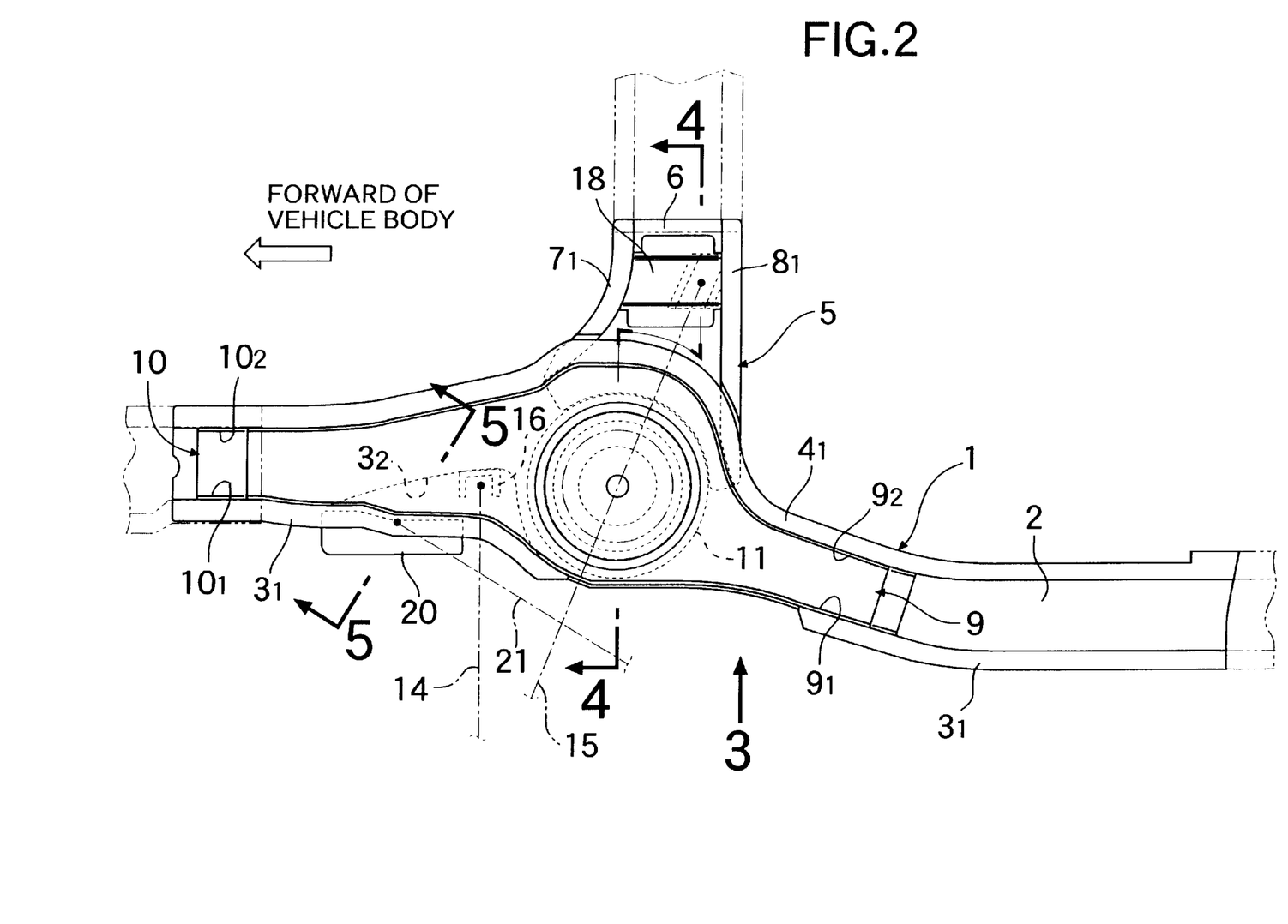
FIG. 2 is a top plan view of the vehicle body structure looking in the direction of arrow 2 in FIG. 1.

A rear suspension includes an upper arm 14 and a lower arm 15 (see FIGS. 1, 2 and 4), and a knuckle (not shown) for a left rear wheel W is supported at each top end of the arms 14 and 15. The rod-shaped upper arm 14 is pivotally supported at its base end for vertically swinging movement on an upper arm supporting bracket 16 which is welded to an inner surface of the recess $3_2$ in the side frame 1. A lower arm supporting bracket 17 is welded to a lower surface of the bottom wall 6 of the cross frame 5, and the substantially plate-shaped lower arm 15 is pivotally supported at its base end for vertically swinging movement on the lower arm supporting bracket 17. The weld zone between the bottom wall 6 of the cross frame 5 and the lower arm supporting bracket 17 is reinforced with a reinforcing member 18 welded to the upper surface of the bottom wall 6 of the cross frame 5.

A short column-shaped stopper abutment $15_1$ is projectingly provided on an upper surface of the lower arm 15, and a coil spring 19 is supported at its lower end on an outer periphery of the stopper abutment $15_1$ and also supported at its upper end on the lower surface of the bottom wall $11_1$ of the spring base 11 in such a manner that it is loosely fitted over or around outer peripheries of the stopper 13 and the stopper supporting bracket 12. In a static state, the stopper abutment $15_1$ on the upper surface of the lower arm 15 is opposed to the lower surface of the stopper 13 at a predetermined gap left therebetween. An upper wall of a spring accommodating recess 23 (see FIG. 4) defined within the side frame 1 is constituted by the bottom wall $11_1$ of the spring base 11, while a sidewall of the spring accommodating recess 23 is constituted by the sidewall $11_2$ of the spring base 11.

Thus, when the upper arm 14 and the lower arm 15, to which the vertical movement of the left rear wheel W has been transmitted, are swung vertically, the coil spring 19 disposed between the lower arm 15 and the spring base 11 is expanded or contracted to buffer the vertical movement of the left rear wheel W. When the lower arm 15 is vertically swung to a large extent, the stopper abutment $15_1$ formed on the upper surface of the lower arm 15 is brought into abutment against the lower surface of the stopper 13 to define the limit of the upward swinging movement of the lower arm 15.

A damper supporting bracket 20 is welded to an outside of the recess $3_2$ defined in the left sidewall 3 of the side frame 1. Due to the presence of the recess $3_2$, the damper supporting bracket 20 cannot be welded directly to the left sidewall 3 of the side frame 1, and for this reason, the damper supporting bracket 20 is welded utilizing the flange $3_1$ connected to the upper portion of the left sidewall 3 (see FIGS. 2 and 5). A damper 21 is supported on the base end of the damper supporting bracket 20, and has a rod 22 (see FIG. 1) connected to the knuckle (not shown) bent in an L-shape. Therefore, when the knuckle is moved vertically along with the left rear wheel W, the damper 21 can be expanded or contracted to damp the vertical movement of the left rear wheel W.

The base end of the upper arm 14 and the base end of the rear damper 21 are accommodated utilizing the recess $3_2$ defined in the sidewall 3 of the side frame 1 in the above manner, and therefore, the level of the side frame 1 can be correspondingly lowered, whereby the level of the floor of the vehicle can be lowered, as compared with the case where the base ends of the upper arm 14 and the rear damper 21 are supported on the lower surface of the side frame 1.

In addition, the upper end of the coil spring 19 of the rear suspension is accommodated in the spring accommodating recess 23 defined within the side frame 1 and therefore, even if the side frame 1 is formed into a straight shape as viewed from the side, a sufficient length of the coil spring 19 can be ensured to enhance the buffering performance. Moreover, the level of the floor panel supported on the upper surface of the coil spring 19 can be lowered and flattened and hence, the know-how of use of the vehicle can be enhanced.

Since the opening $2_1$ for introducing the coil spring 19 into the spring accommodating recess 23 is defined in the bottom wall 2 of the side frame 1, the rigidity of the side frame 1 is reduced due to the opening $2_1$. However, the side frame 1 is reinforced in the vicinity of the spring accommodating recess 23 with the first stiffener 9, the second stiffener 10 and the cross frame 5, and therefore, sufficient rigidity of the entire side frame 1 can be ensured.

A reduction in strength of the side frame 1 is caused by the opening $2_1$ of the bottom wall 2, but the side frame 1 can be effectively reinforced, because the longitudinal dimension of the second stiffener 10 for reinforcing the peripheral edge of the opening $2_1$ is larger than that of the first stiffener 9. In addition, the cup-shaped spring base 11 is fitted in the openings $2_1$ and $10_3$ in the bottom wall 2 of the side frame 1 and in the second stiffener 10 and hence, it is possible to prevent the entering of mud and the like into the side frame 1 by the spring base 11. Also, the bottom wall 2 of the side frame 1 and the first stiffener 9 are integrated by the spring base 11 and hence, it is possible to further effectively reinforce the side frame 1, which is otherwise reduced in rigidity due to the opening $2_1$.

Although the preferred embodiment of the present invention has been described in detail, it will be understood that the present invention is not limited to the above-described embodiment, and that various modifications may be made without departing from the spirit and scope of the invention defined in claims.

What is claimed is:

1. A vehicle body structure at a rear portion of a vehicle, comprising a side frame extending in a longitudinal direction of a vehicle body, a spring accommodating recess provided in said side frame for accommodating an upper end of a coil spring of a rear suspension, wherein said side frame is formed with a grooved sectional configuration having an open upper surface, and includes a bottom wall and left and right sidewalls, a first stiffener connected to the side frame for closing and reinforcing an open portion of the upper surface of said side frame in the vicinity of said spring accommodating recess, and an opening of said spring accommodating recess being defined in said bottom wall of said side frame.

2. A vehicle body structure at a rear portion of a vehicle according to claim 1, wherein the upper surface of the bottom wall of said side frame in the vicinity of the spring accommodating recess is reinforced with a second stiffener superposed thereon, and the opening of said spring accommodating recess is also defined in said second stiffener.

3. A vehicle body structure at a rear portion of a vehicle according to claim 2, wherein a longitudinal dimension of said second stiffener is set larger than that of said first stiffener.

4. A vehicle body structure at a rear portion of a vehicle according to claim 1, further including a cup-shaped spring base having an open lower surface, which is fitted from below into the opening of said spring accommodating recess, an upper end of said spring base is coupled to the first stiffener, while a lower end of said spring base is coupled to said bottom wall of said side frame.

5. A vehicle body structure at a rear portion of a vehicle according to claim 1, further including a cross frame which is coupled at an end face thereof to a side of the side frame, and said spring accommodating recess is disposed in the vicinity of coupled portions of said side frame and said cross frame.

6. A vehicle body structure at a rear portion of a vehicle according to claim 5, wherein said side frame and said cross frame are disposed at substantially the same level.

7. A vehicle body structure at a rear portion of a vehicle according to claim 1, wherein said side frame has a recess defined in its sidewall for accommodating a base end of an upper arm of said rear suspension.

8. A vehicle body structure at a rear portion of a vehicle according to claim 7, further including a rear damper which is connected at said base end to a rear damper supporting bracket mounted on a side of said side frame, a portion of said rear damper being accommodated in said recess defined in the sidewall of said side frame.

9. A body structure at a rear portion of a vehicle, the structure comprising:

a rear side frame extending in a longitudinal direction of the vehicle body, said rear side frame being channel-shaped open upwardly in section;

a recess defined in said rear side frame for accommodating therein an upper end of a suspension coil spring, an opening for said recess being defined through a bottom wall of said rear side frame; and stiffener means for reinforcing said rear side frame in a vicinity of said recess to assure rigidity of the rear side frame.

10. A body structure according to claim 9, wherein said stiffener means includes a first stiffener for closing and reinforcing an upper portion of the rear side frame in the vicinity of said recess.

11. A rear body structure according to claim 10, wherein said stiffener means further comprises a second stiffener superposed on an upper surface of the bottom wall of the rear side frame in the vicinity of said spring accommodating recess, the opening of said recess is also defined in said second stiffener.

12. A rear body structure according to claim 9, wherein said stiffener means comprises a stiffener member superposed on an upper surface of the bottom wall of the rear side frame in the vicinity of said spring accommodating recess, the opening of said recess is also defined in said stiffener member.

13. A vehicle body structure at a rear portion of a vehicle according to claim 11, wherein a longitudinal dimension of said second stiffener is set larger than that of said first stiffener.

14. A vehicle body structure according to claim 9, further including a cup-shaped spring base having an open lower surface, which is fitted from below into the opening of said spring accommodating recess, an upper end of said spring base is coupled to a first stiffener of the stiffener means, while a lower end of said spring base is coupled to said bottom wall of said rear side frame.

15. A vehicle body structure at a rear portion of a vehicle according to claim 9, further including a cross frame which is coupled at an end face thereof to a side of the rear side frame, and said spring accommodating recess is disposed in the vicinity of coupled portions of said rear side frame and said cross frame.

16. A vehicle body structure at a rear portion of a vehicle according to claim 15, wherein said side frame and said cross frame are disposed at substantially the same level.

17. A vehicle body structure according to claim 9, wherein said rear side frame has a recess defined in its sidewall for accommodating a base end of an upper arm of the rear suspension.

18. A vehicle body structure according to claim 17, further including a rear damper which is connected at said base end to a rear damper supporting bracket mounted on a side of said side frame, a portion of said rear damper being accommodated in said recess defined in the sidewall of said side frame.

19. A vehicle body structure according to claim 9, further including stopper means disposed in said recess for limiting upward swinging movement of a suspension arm.

* * * * *

UNITED STATES PATENT AND TRADEMARK OFFICE
CERTIFICATE OF CORRECTION

PATENT NO. : 6,109,653
DATED : AUGUST 29, 2000
INVENTOR(S) : KAZUHIKO MARUYAMA, MASASHI OHKUBO

It is certified that error appears in the above-identified patent and that said Letters Patent is hereby corrected as shown below:

Column 7, line 9 (claim 8, 2nd line), delete "which";
  line 10 (claim 8, 3rd line), change "is connected at said" to --having a--; after "end" insert --which is connected--.

Column 8, 29th line (claim 18, 2nd line), change "which is connected at said" to --having a--; after "end" insert --which is connected--.

Signed and Sealed this

Twenty-ninth Day of May, 2001

*Attest:*

NICHOLAS P. GODICI

*Attesting Officer*     Acting Director of the United States Patent and Trademark Office